United States Patent
Ohtsuka et al.

(10) Patent No.: US 6,795,475 B1
(45) Date of Patent: Sep. 21, 2004

(54) SOLID-STATE LASER APPARATUS EXCITED BY LASER LIGHT FROM SEMICONDUCTOR LASER UNIT HAVING INCREASED RESONATOR LENGTH

(75) Inventors: Hisashi Ohtsuka, Kaisei-machi (JP); Yoji Okazaki, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/552,540

(22) Filed: Apr. 19, 2000

(30) Foreign Application Priority Data

Apr. 21, 1999 (JP) .......................................... 11-113482

(51) Int. Cl.[7] .......................... H01S 3/10; H01S 3/113; H01S 5/00; H01S 3/04; H01S 3/08
(52) U.S. Cl. ............................... 372/92; 372/9; 372/11; 372/21; 372/22; 372/43; 372/69; 372/75
(58) Field of Search ................................ 372/9, 11, 21, 372/22, 43, 69, 75, 92, 29.021, 49, 46, 19, 98

(56) References Cited

U.S. PATENT DOCUMENTS 5,642,375 A * 6/1997 King et al. ................... 372/97
5,671,240 A * 9/1997 Okazaki ....................... 372/19
5,856,994 A * 1/1999 Hayakawa ................... 372/75
6,058,126 A * 5/2000 Ishikawa et al. ............. 372/75

FOREIGN PATENT DOCUMENTS

JP          11-82723          7/1989

OTHER PUBLICATIONS

U.S. Seial No. 08/993,178, corresponding to Japanese Unexamined Patent Publication No. 10 (1998)–190131.

* cited by examiner

Primary Examiner—Don Wong
Assistant Examiner—Armando Rodriguez
(74) Attorney, Agent, or Firm—Stroock & Stroock & Lavan LLP

(57) ABSTRACT

A semiconductor-laser-excited solid-state laser apparatus includes a solid-state laser element and a semiconductor laser unit including a resonator. The solid-state laser element is excited by light emitted from the semiconductor laser unit, and emits laser light. The resonator length in the semiconductor laser unit is arranged to be at least 0.8 mm, so as to reduce an amount of wavelength shift in light emitted from the semiconductor laser unit, and achieve a stable, high-power laser output from the semiconductor-laser-excited solid-state laser apparatus.

18 Claims, 3 Drawing Sheets

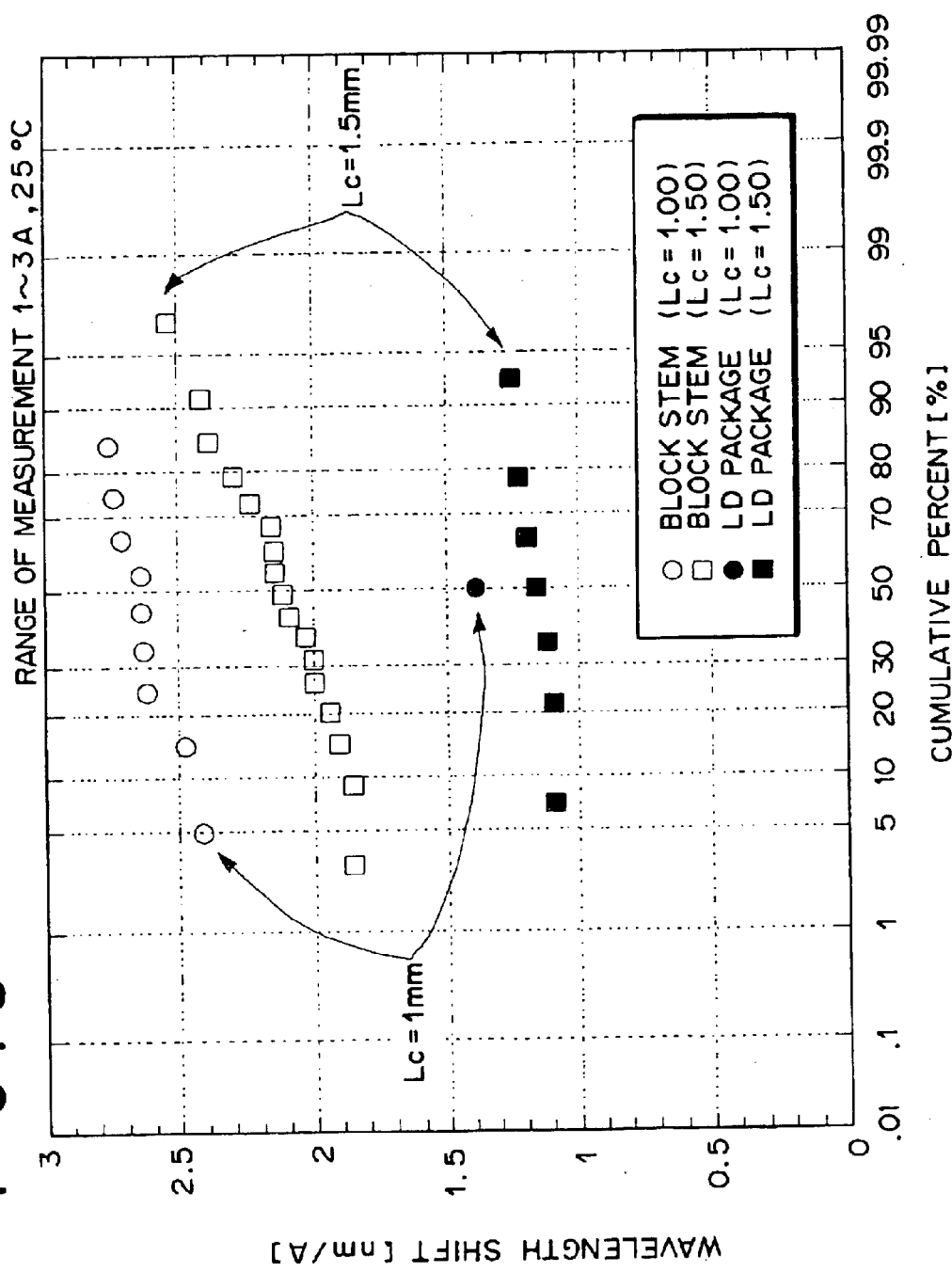

SOLID-STATE LASER APPARATUS EXCITED BY LASER LIGHT FROM SEMICONDUCTOR LASER UNIT HAVING INCREASED RESONATOR LENGTH

BACKGROUND OF THE INVENTION

1. Field of the Invention

The present invention relates to a semiconductor-laser-excited solid-state laser apparatus in which a solid-state laser crystal is excited by excitation laser light emitted from a semiconductor laser unit as in an excitation light source, and emits laser light.

2. Description of the Related Art

A Currently, there are demands for increase in output power and improvement in quality of solid-state laser apparatuses. In response to these demands, a solid-state laser apparatus achieving high output power is proposed. In the proposed solid-state laser apparatus, a solid-state laser crystal of Nd:YAG, Nd:YVO$_4$, Nd:YLF or the like is excited by excitation laser light emitted from a broad-guide semiconductor laser unit having a high power output. In addition, as a widespread technique, the laser light generated by the solid-state laser crystal may be converted into a second harmonic wave by providing a wavelength conversion element made of, for example, a nonlinear crystal or a domain-inverted LiNbO$_3$, in an external resonator arranged outside of the solid-state laser crystal.

On the other hand, in the current semiconductor-laser-excited solid-state laser apparatuses, the excitation light source is driven under a so-called automatic power control (APC) so as to stabilize the laser oscillation. That is, a portion of output laser light is monitored and fed back to the excitation light source so as to reduce variation in the output laser light. In order to stabilize.the output laser light by the automatic power control, it is desirable that the ratio of an increase in the output of the semiconductor laser unit to an increase in the output of the solid-state laser apparatus is constant, i.e., the output of the solid-state laser apparatus monotonously increases with the increase in the output of the semiconductor laser unit.

Nevertheless, in practice, the output of the solid-state laser apparatus does not monotonously increase even when the output of the semiconductor laser unit is increased by 10% or 20%. In a typical example of the solid-state laser apparatus, the output of the solid-state laser apparatus reaches a level of saturation when the output of the semiconductor laser unit is increased by 8% over an initial driving state.

The above problem is caused by deviation of the oscillation wavelength of the semiconductor laser unit from a desired absorption peak of the solid-state laser crystal. Since a great amount of heat is generated by the semiconductor laser unit, the oscillation wavelength of the semiconductor laser unit is highly dependent on the driving current. That is, the oscillation wavelength of the semiconductor laser unit shifts toward the longer wavelength side with increase in the driving current. Consequently, the deviation of the oscillation wavelength of the semiconductor laser unit from the desired absorption peak of the solid-state laser crystal becomes great.

For example, in a known semiconductor-laser-excited solid-state laser apparatus, a solid-state laser crystal of Nd;YAG is excited by excitation laser light having a wavelength of 809 nm emitted from a semiconductor laser unit, and emits laser light having a wavelength of 946 nm. The full width at half maximum of the peak of the oscillation wavelength at which the solid-state laser crystal of Nd:YAG best absorbs light is very small, i.e., at most 10 nm. Therefore, even when the shift of the wavelength of the excitation laser light is only a few nanometers, the wavelength of the excitation laser light deviates from the desired absorption peak of the solid-state laser crystal of Nd:YAG, and therefore the excitation laser light cannot be efficiently absorbed by the solid-state laser crystal of Nd:YAG. Thus, even when the driving current (driving power) is greatly increased, the increase in the output power of the solid-state laser apparatus is often small.

In order to solve the above problem, an attempt has been made to suppress the dependence of the oscillation wavelength of the semiconductor laser unit on the driving current by enhancing radiation effect of the semiconductor laser unit during emission of high power laser light. As disclosed in Japanese Unexamined Patent Publication No. 10(1998)-190131, which is assigned to the present assignee, an attempt has been made to optimize a mechanical member which fixes a semiconductor laser unit so as to enhance radiation efficiency and reduce the dependence of the oscillation wavelength of the semiconductor laser unit on the driving current.

However, when the output power of the semiconductor laser unit is further increased, the above optimization of the mechanical member is insufficient to sufficiently reduce the dependence of the oscillation wavelength of the semiconductor laser unit on the driving current.

Japanese Patent Application No. 11(1999)-82723, which is also assigned to the present assignee, proposes a method for solving the above problems. In the proposed method, provision is made in driving of the semiconductor laser unit so that the deviation of the oscillation wavelength of the semiconductor laser unit is prevented. Nevertheless, the characteristic of the semiconductor laser unit per se has not been fundamentally improved by the method. Therefore, output loss occurs in the solid-state laser apparatus. Thus, it is not possible to further increase the output power by the method.

SUMMARY OF THE INVENTION

The object of the present invention is to provide a semiconductor-laser-excited solid-state laser apparatus in which stable automatic power control is performed, and from which high power laser light is output.

According to the present invention, there is provided a semiconductor-laser-excited solid-state laser apparatus includes a solid-state laser element and a semiconductor laser unit including a resonator. The solid-state laser element is excited by light emitted from the semiconductor laser unit, and emits laser light. The resonator length in the semiconductor laser unit is arranged to be at least 0.8 mm.

According to the present invention, the resonator length in the semiconductor laser unit is arranged to be at least 0.8 mm, which is longer than the lengths of the resonators in the semiconductor laser units in the conventional semiconductor-laser-excited solid-state laser apparatuses. Since heat is mainly generated in the resonator of the semiconductor laser unit, the area of the semiconductor laser unit which is in contact with a radiation member such as a heatsink is increased with the increase in the resonator length, and therefore ability to dissipate the heat generated in the semiconductor laser unit is enhanced. Accordingly, the dependence of the oscillation wavelength of the semiconductor laser unit on the driving current can be remarkably reduced. Thus, the wavelength of the excitation laser light does not substantially deviate from an absorption band of the solid-state laser crystal, in which the solid-state laser crystal best absorbs the excitation laser light. Thus, the solid-state laser crystal can be efficiently excited, and a stable laser output can be obtained from the semiconductor-laser-excited solid-state laser apparatus.

In addition, the substantial area of the light emitting portion of the semiconductor laser unit is increased due to the above increase in the length of the resonator. Therefore, the operating current density can be reduced. Accordingly, it is possible to prevent deterioration of the semiconductor laser unit due to damage of the light emitting portion caused by the high current density. Thus, reliability of the semiconductor-laser-excited solid-state laser apparatus can be increased.

Preferably, the resonator length in the semiconductor laser unit is at least 1 mm. It is further preferable that the length of the resonator is at least 1.5 mm.

Further, the semiconductor-laser-excited solid-state laser apparatus according to the present invention may further comprise a second resonator which is formed by the solid-state laser element and a mirror arranged outside of the solid-state laser element, and a wavelength conversion element which is arranged in the second resonator, and generates a second harmonic wave.

DESCRIPTION OF THE DRAWINGS

FIG. 3 is a graph illustrating the relationship between the wavelength shift in the semiconductor laser output and the resonator length in the semiconductor laser unit.

DESCRIPTION OF PREFERRED EMBODIMENTS

Embodiments of the present invention are explained in detail below with reference to drawings.

Figure 1:
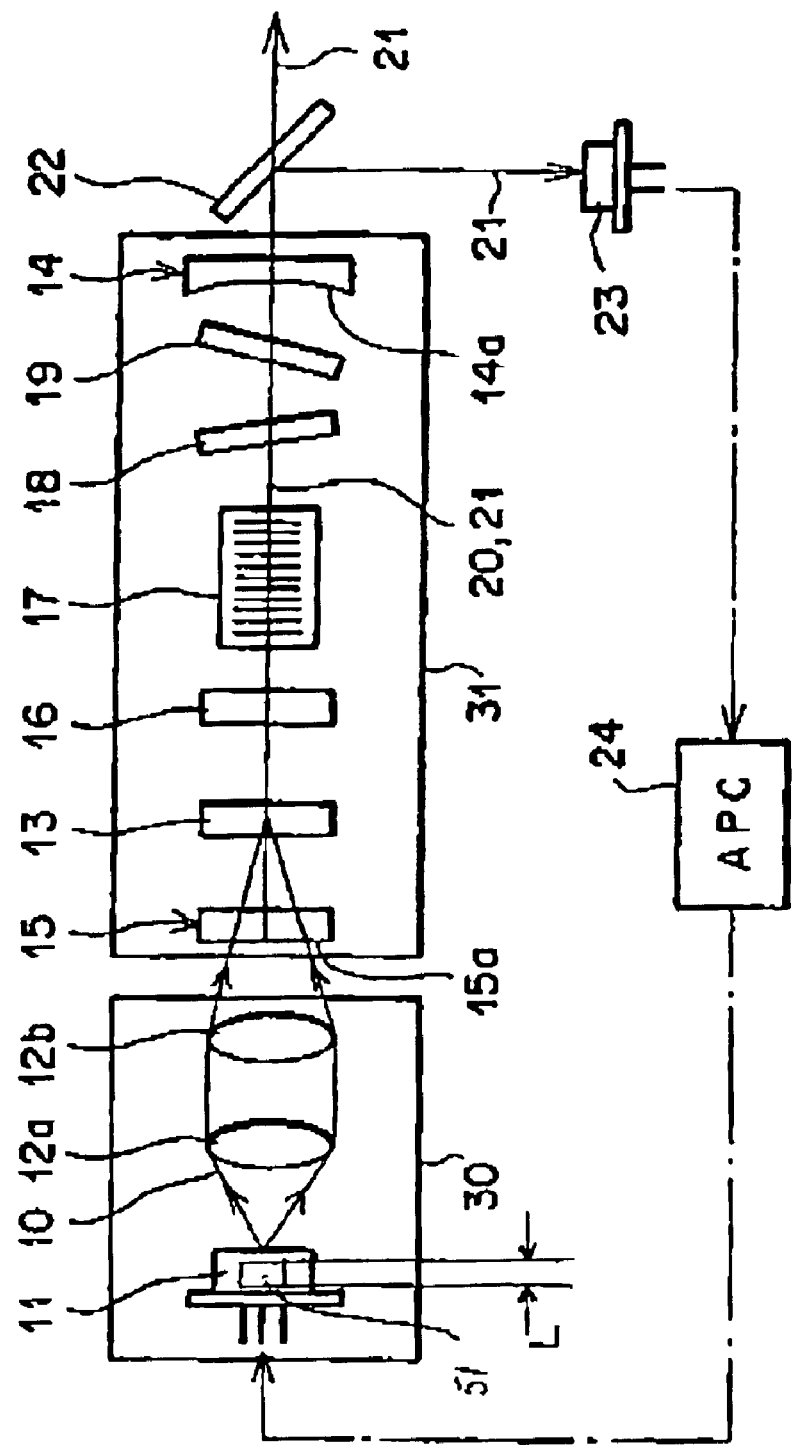
FIG. 1 is a diagram illustrating the construction of the semiconductor-laser-excited solid-state laser apparatus in an embodiment of the present invention.

FIG. 1 is a diagram illustrating the construction of the semiconductor-laser-excited solid-state laser apparatus in an present invention. The semiconductor-laser-excited solid-state laser apparatus of FIG. 1 comprises a semiconductor laser unit 11 having a resonator 51, condenser lenses 12a and 12b, a solid-state laser medium 13, a resonator mirror 14, quarter-wave plates 15 and 16, an optical wavelength conversion element 17, a polarization control element 18, a wavelength selection element 19, a beam splitter 22, an optical detector 23, and an automatic power control (APC) circuit 24.

The semiconductor laser unit 11 emits a laser beam 10 as excitation light. The condenser lenses 12a and 12b condense the laser beam 10, which is originally divergent light. The solid-state laser medium 13 is, for example, a neodymium-doped YLF crystal (Nd:YLF crystal). The resonator mirror 14 is arranged at the forward end of a solid-state laser resonator 31. The quarter-wave plates 15 and 16 are provided on the forward and back sides of the Nd:YLF crystal 13 for realizing the so-called twist mode oscillation in the solid-state laser resonator. The optical wavelength conversion element 17, the polarization control element 18, and the wavelength selection element 19 are arranged on the forward side of the quarter-wave plate 16 in this order.

In addition, the semiconductor laser unit 11 and the condenser lenses 12a and 12b are fixed on a mount 30 to form an excitation unit. The mount 30 is made of, for example, copper, and the excitation unit is maintained at a predetermined temperature by a temperature control element and a temperature control circuit, which are not shown.

The optical wavelength conversion element 17 is made of an MgO-doped $LiNbO_3$ crystal, and periodic domain-inverted structure is formed in the MgO-doped $LiNbO_3$ crystal. For example, the polarization control element 18 is realized by a Brewster plate, and the wavelength selection element 19 is realized by an etalon.

The semiconductor laser unit 11 emits the laser beam 10 having a wavelength of 797 nm. When neodymium ions in the Nd:YLF crystal 13 are excited by the laser beam 10, the Nd:YLF crystal 13 emits light having a wavelength of 1.313 nm.

The outer end surface 15a of the quarter-wave plate 15 is coated so that the outer end surface 15a allows passage of the excitation laser light 10 having the wavelength of 797 nm, and efficiently reflects light having the wavelength of 1.313 nm or 657 nm, where the outer end surface 15a of the quarter-wave plate 15 has a form of a concave mirror. The light having the wavelength of 657 nm will be explained later. The mirror surface 14a of the resonator mirror 14 is coated so that the mirror surface 14a efficiently reflects light having the wavelength of 1.313 nm and the excitation laser light 10, and allows passage of a portion of the light having the wavelength of 657 nm. Therefore, the light having the wavelength of 1.313 nm resonates between the outer end surface 15a of the quarter-wave plate 15 and the mirror surface 14a of the resonator mirror 14 to generate laser oscillation. The optical wavelength conversion element 17 converts the light having the wavelength of 1.313 nm into a second harmonic wave, which is the above light having the wavelength of 657 nm. Thus, a Fabry-Perot solid-state laser resonator 31 is formed between the outer end surface 15a of the quarter-wave plate 15 and the mirror surface 14a of the resonator mirror 14, and almost only the second harmonic wave 21 is output through the resonator mirror 14. In the Fabry-Perot solid-state laser resonator 31, the direction of the linear polarization is controlled by the polarization control element 18, and single-wavelength oscillation is realized by the wavelength selection element 19.

The beam splitter 22 is provided on the forward side of the resonator mirror 14 so that a first portion of the laser light emitted through the resonator mirror 14 is received by the optical detector 23, and the second portion 21 of the laser light passes through the beam splitter 22 and is output from the semiconductor-laser-excited solid-state laser apparatus of FIG. 1. The optical detector 23 is realized, for example, by a photodiode, and detects the intensity of the first portion of the laser light emitted through the resonator mirror 14. The detected result (the output of the optical detector 23) is supplied to the automatic power control (APC) circuit 24, and the automatic power control (APC) circuit 24 controls the driving current of the semiconductor laser unit 11 based on the output of the optical detector 23 so that the intensity of the second harmonic wave 21 output from the semiconductor-laser-excited solid-state laser apparatus of FIG. 1 is maintained constant.

Figure 2:
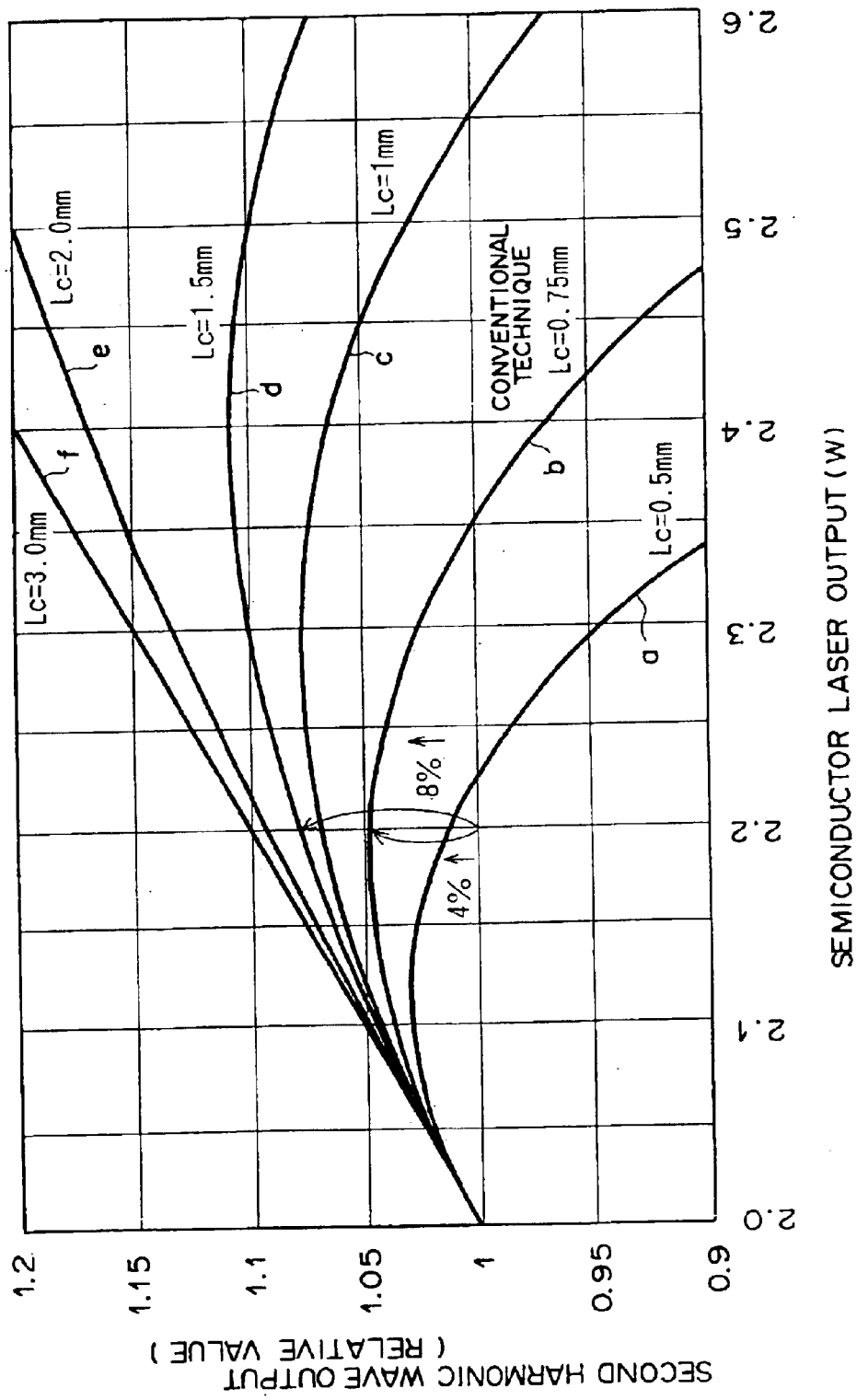
FIG. 2 shows graphs of the second harmonic wave output versus the output power of the semiconductor laser unit in semiconductor-laser-excited solid-state laser apparatuses in which lengths of resonators in the semiconductor laser units are respectively 0.5 mm, 0.75 mm, 1 mm, 1.5 mm, 2 mm, and 3 mm.

FIG. 2 shows graphs illustrating relationships between the second harmonic wave output and the output power of the semiconductor laser unit, in semiconductor-laser-excited solid-state laser apparatuses in which the resonator lengths in the semicondutor laser units are respectively 0.5 mm, 0.75 mm, 1mm, 1.5 mm, 2 mm, and 3 mm. As illustrated by the curve b in FIG. 2, when the output power of the semiconductor laser unit is increased by 10% from 2.0 W to 2.2 W in the conventional semiconductor-laser-excited solid-state laser apparatus in which the resonator length in the semiconductor laser unit is 0.75 mm, the increase in the second harmonic wave output is only 4%. That is, solid-state laser is not efficiently excited by the semiconductor laser unit having the 0.75 long resonator 51.

On the other hand, the second harmonic wave output is increased by 8% with 10 increase in the output power of the semiconductor laser unit having a 1.5 mm long resonator 51, as illustrated by the curve d in FIG. 2. That is, the increase in the second harmonic wave output is double when the resonator length in the semiconductor laser unit is increased from 0.75 mm to 1.5 mm. When the resonator length in the semiconductor laser unit is further increased, the second harmonic wave output can be increased accordingly, as illustrated in FIG. 2. For example, in the semiconductor-laser-excited solid-state laser apparatus in which the resonator length in the semiconductor laser unit is 3.0 mm, the second harmonic wave output increases linearly with the increase in the output power of the semiconductor laser unit, as illustrated by the curve f in FIG. 2. That is, an ideal output characteristic is obtained when the semiconductor laser unit includes the 3.0 mm long resonator 51.

FIG. 3 is graph illustrating the relationship between the wavelength shift and the resonator length in the semiconductor laser unit. In FIG. 3, the blank circles indicate the wavelength shift values in the output of the semiconductor laser unit when the semiconductor laser unit having a 1.0 mm long resonator 51 is simply fixed to a block stern as a fixture; the blank squares indicate the wavelength shift values when the semiconductor laser unit having a 1.5 mm long resonator 51 is simply fixed to a block stern as a fixture; the filled circle indicates the wavelength shift value when the semiconductor laser unit having a 1.0 mm long resonator 51 is mounted in a laser diode (LD) package; and the filled squares indicate the wavelength shift values when the semiconductor laser unit having a 1.5 mm long resonator 51 is mounted in a laser diode (LD) package. In the laser diode (LD) package, the semiconductor laser unit is in contact with a heat sink or the like, and is provided with a cooling apparatus.

As illustrated in FIG. 3, although the wavelength shift value is about 1.4 nm/A when the semiconductor laser unit is mounted in the laser diode (LD) package having a 1.0 mm long resonator, the wavelength shift values are reduced to about 1.1 to 1.3 nm/A when the resonator length in the semiconductor laser unit mounted in the laser diode (LD) package is increased to 1.5 mm. That is, when the resonator length in the semiconductor laser unit is arranged to be at least 1.0 mm, it is possible to maintain the wavelength shift values within the width of the absorption band of the solid-state laser crystal, and obtain a stable laser output. In addition, it is preferable that the resonator length in the semiconductor laser unit is arranged to be at least 1.5 mm. Although not shown in FIG. 3, when the resonator length in the semiconductor laser unit is further increased, the wavelength shift values can be reduced to at most 1 nm/A, and a further stable optical output can be obtained.

The present invention can be applied to all types of semiconductor-laser-excited solid-state laser apparatuses.

For example, the scope of the present invention is not limited to the semiconductor-laser-excited solid-state laser apparatuses in which wavelength conversion is performed by an optical wavelength conversion element. The advantages of the present invention can be obtained in other semiconductor-laser-excited solid-state laser apparatuses in which the wavelength conversion of the solid-state laser light is not performed.

In addition, all of the contents of the Japanese patent application No. 11(1999)-113482 are incorporated into this specification by reference.

What is claimed is:

1. A semiconductor-laser excited solid state laser apparatus comprising:

a semiconductor laser unit including an internal resonator; and a solid state laser element which emits laser light in response to excitation light from said semiconductor laser unit;

wherein said internal resonator has a length of at least 1 mm, with said internal resonator length being dependent upon a characteristic of said solid state laser element.

2. A semiconductor-laser-excited solid state laser apparatus according to claim 1, wherein said internal resonator has a length of at least 1.5 mm.

3. A semi conductor-laser-excited solid state laser apparatus comprising:

a semiconductor laser unit including an internal resonator having a length of at least 1 mm;

a solid state laser element which emits laser light in response to excitation light from said semiconductor laser unit;

a solid state laser resonator having a solid state laser resonator length, wherein said solid state laser includes said solid state laser element and a mirror arrange outside of said solid state laser element, with said internal resonator length being independent of said solid state laser resonator length; and a wavelength conversion element arrange in said solid state laser resonator, which generates a second harmonic wave.

4. A semiconductor-laser-excited solid state laser apparatus according to claim 3, wherein said internal resonator has a length of at least 1.5 mm.

5. A semi conductor-laser excited solid state laser apparatus as claimed in claim 1 wherein said internal resonator length is dependent upon an absorption and of said solid state laser element.

6. A semi conductor-laser excited solid state laser apparatus as claimed in claim 1 wherein said solid state laser element is a crystal doped with a highly reactive rare earth metal.

7. A semi conductor-laser excited solid state laser apparatus as claimed in claim 1 wherein said solid state laser element is a neodymium doped crystal.

8. A semi conductor-laser excited solid state laser apparatus as claimed in claim 1 wherein said solid state laser element is a YLF crystal.

9. A semi conductor-laser excited solid-state laser apparatus as claimed in claim 1 wherein said solid state-laser element is a component of a Fabry-Perot solid state laser resonator.

10. A semi conductor-laser excited solid state laser apparatus as claimed in claim 1 wherein said internal resonator length is selected to cause a wavelength of said excitation light to remain within an absorption band of said solid state laser element.

11. A semiconductor laser excited solid state laser apparatus as claimed in claim 1 wherein a wavelength of said excitation light is independent of a driving current of said semiconductor laser unit.

12. A semi conductor-laser excited solid state laser apparatus as claimed in claim 3 wherein said internal resonator length is selected based upon an absorption band of said solid state laser element.

13. A semi conductor-laser excited solid state laser apparatus as claimed in claim 3 wherein said solid state laser element is a crystal doped with a highly reactive rare earth metal.

14. A semi conductor-laser excited solid state laser apparatus as claimed in claim 3 wherein said solid state laser element is a neodymium doped crystal.

15. A semi conductor-laser excited solid state laser apparatus as claimed in claim 3 wherein said solid state laser element is a YLF crystal.

16. A semi conductor-laser excited solid state laser apparatus as claimed in claim 3 wherein said wavelength conversion element is a MgO doped $LiNbO_3$ crystal.

17. A semi conductor-laser excited solid state laser apparatus as claimed in claim 3 wherein said internal resonator length is selected to cause a wavelength of said excitation light to remain within an absorption band of said solid state laser element.

18. A semiconductor laser excited solid state laser apparatus as claimed in claim 1 wherein a wavelength of said excitation light is independent of a driving current of said semiconductor laser unit.

* * * * *